United States Patent
Nakahara et al.

(10) Patent No.: US 8,497,327 B2
(45) Date of Patent: Jul. 30, 2013

(54) HYDROGENATED β-PINENE-BASED POLYMERS AND MOLDED ARTICLES COMPRISING THE SAME

(75) Inventors: Atsuhiro Nakahara, Okayama (JP); Jin Tokuyasu, Ibaraki (JP); Takashi Hori, Okayama (JP); Hiroyuki Ohgi, Okayama (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 186 days.

(21) Appl. No.: 12/936,764

(22) PCT Filed: Apr. 9, 2009

(86) PCT No.: PCT/JP2009/057247
§ 371 (c)(1),
(2), (4) Date: Nov. 19, 2010

(87) PCT Pub. No.: WO2009/125810
PCT Pub. Date: Oct. 15, 2009

(65) Prior Publication Data
US 2011/0124830 A1 May 26, 2011

(30) Foreign Application Priority Data

Apr. 10, 2008 (JP) ................................. 2008-102682

(51) Int. Cl.
*C08C 19/02* (2006.01)
*C08F 8/02* (2006.01)
*C08F 8/42* (2006.01)

(52) U.S. Cl.
USPC .......... 525/338; 525/54.4; 525/339; 526/348; 526/348.3; 526/238.3

(58) Field of Classification Search
USPC .............. 525/54.4, 338, 339; 526/348, 348.3, 526/238.3
See application file for complete search history.

(56) References Cited

U.S. PATENT DOCUMENTS

| | | | |
|---|---|---|---|
| 2,416,902 A | 3/1947 | Carmody | |
| 7,385,018 B2 | 6/2008 | Mine | |
| 2009/0209720 A1* | 8/2009 | Kamigaito et al. | ........... 526/348 |

FOREIGN PATENT DOCUMENTS

| | | |
|---|---|---|
| CN | 1422877 A | 6/2003 |
| CN | 1630668 A | 6/2005 |

(Continued)

OTHER PUBLICATIONS

Satoh, Green Chem., 2006, 8, 878-882.*

(Continued)

*Primary Examiner* — Robert C Boyle
(74) *Attorney, Agent, or Firm* — Oblon, Spivak, McClelland, Maier & Neustadt, L.L.P.

(57) ABSTRACT

The present invention provides hydrogenated β-pinene-based polymers with excellent heat resistance and light resistance, low absorptivity and high transparency, as well as molded articles thereof. The polymers of the present invention contain 50% by mass or more of β-pinene units and are hydrogenated β-pinene-based polymers where the ratio of the proton integral value at 6 to 8 ppm to the total proton integral value in a $^1$H-NMR spectrum is $2.3 \times 10^{-5}$ or less or the p-phenylene group content is 0.0055% by mass or less, and the ratio of the proton integral value at 4.5 to 6 ppm to the total proton integral value is $2.8 \times 10^{-4}$ or less or the cyclohexene-1,4-diyl group content is 0.29% by mass or less. The molded articles of the present invention contain the above hydrogenated β-pinene-based polymers.

20 Claims, 2 Drawing Sheets

FOREIGN PATENT DOCUMENTS

| | | |
|---|---|---|
| EP | 2 075 265 A1 | 7/2009 |
| JP | 60 168708 | 9/1985 |
| JP | 61 115912 | 6/1986 |
| JP | 61 120816 | 6/1986 |
| JP | 64 24826 | 1/1989 |
| JP | 2002 121231 | 4/2002 |
| TW | 200829617 * | 7/2008 |

OTHER PUBLICATIONS

Extended European Search Report issued Mar. 2, 2011, in Patent Application No. 09729351.8.

Chinese Office Action Issued Jul. 4, 2012 in Patent Application No. 200980112477.6.

Sugiyama, H., et al., "Heat-resistant alicyclic hydrocarbon polymers from biomass," Polymer Preprints, Japan, vol. 55, No. 2, 2Z10, pp. 5650-5651, (2006), (with English Abstract).

Sugiyama, H., et al., "Precision Cationic Polymerization of Plant-Originated Alicyclic Terpene," Polymer Preprints, Japan, vol. 55, No. 1, 1Pe011, p. 516, (2006), (with English Abstract).

Sugiyama, H., et al., "Precision Cationic Polymerization of Plant-Originated β-Pinene," Polymer Preprints, Japan, vol. 56, No. 2, 1Pe017, p. 2507, (2007), (with English Abstract).

Sugiyama, H., et al., "β-pinene no Seimitsu Cation Jugo ni yoru Shinki tankasui Sokei Polymer no Kaihatsu," Annual Meeting of Union of Chemistry-Related Societies in Chubu, Japan, vol. 38, p. 2F07, (Nov. 11, 2007).

Satoh, K., et al., "Biomass-derived heat-resistant alicyclic hydrocarbon polymers: poly(terpenes) and their hydrogenated derivatives," Green Chemistry, vol. 8, pp. 878-882, (Aug. 29, 2006).

Keszler, B., et al., "Synthesis of High Molecular Weight Poly (β-Pinene)," Advances in Polymer Science, vol. 100, pp. 1-9, (1992).

International Search Report issued Jun. 16, 2009 in PCT/JP09/057247 filed Apr. 9, 2009.

* cited by examiner

HYDROGENATED β-PINENE-BASED POLYMERS AND MOLDED ARTICLES COMPRISING THE SAME

CROSS-REFERENCE TO RELATED APPLICATIONS

The present application claims priority to Japanese Patent Application No. 2008-102682, filed Apr. 10, 2008, the subject matter of which is incorporated herein by reference in its entirety.

TECHNICAL FIELD

The present invention relates to β-pinene-based polymers that have higher heat resistance and light resistance by virtue of having fewer olefinic double bonds and aromatic rings, as compared to the conventional ones, molded articles comprising the above β-pinene-based polymers, and processes for preparing the same.

BACKGROUND

Recently, expectations for optical resins are getting higher, where there is a need for resins with excellent heat resistance and light resistance, low absorptivity and high transparency. However, conventional optical resins do not have the above required properties in balance at a high level, and thus have various disadvantages as an optical resin.

For example, for optical resins with high transparency, conventionally polymethylmethacrylates, polycarbonates and the like have been used. Polymethylmethacrylates have excellent optical properties such as high transparency and low birefringence, but are problematic in that the dimensions are apt to change due to their high absorptivity and also they have low heat resistance. On the other hand, polycarbonates have a high glass transition temperature ($T_g$) and excellent heat resistance, but are problematic in that their absorptivity is somewhat high and they are prone to hydrolyzation by alkali.

For optical resins with high heat resistance, low absorptivity and excellent transparency, hydrogenated ring-opening polymers of norbornene-based monomers, or addition copolymers of norbornene-based monomers with ethylene have been known (Patent documents 1-4). However, it is not always easy to prepare polycyclic monomers of tetracyclododecenes used as the norbornene-based monomers, and it is necessary to use chlorides of rare metals such as molybdenum and tungsten for the polymerization catalysts.

As an optical resin that overcomes the above problems, β-pinene-based polymers have been proposed (Patent document 5, Non-patent documents 1-2). β-pinene-based polymers are materials having high heat resistance and low absorptivity. Further, they have been in the spotlight as carbon neutral materials that inhibit the emission of carbon dioxide, which has been a recent problem. However, no β-pinene-based polymers have been reported that have both higher heat resistance and light resistance. That is, the copolymers of β-pinene with indene, which are described in Patent document 5 (Examples 7 to 12), have high heat resistance, but are problematic in that they are prone to oxidization and degradation due to the residual β-pinene-derived olefinic double bonds or indene-derived aromatic double bonds, and are thus easily colored by light or heat. In addition, although there is an example described in Non-patent document 1 of a β-pinene-based polymer having high light resistance, hydrogenation is insufficient, and during the addition of contacted hydrogen by conventional hydrogenation catalysts, the β-pinene-derived 6-membered rings are aromatized to some degree when hydrogen is added, resulting in insufficient heat resistance.

REFERENCES

Patent Document 1: Japanese Laid-Open Publication No. (Sho)64-24826
Patent Document 2: Japanese Laid-Open Publication No. (Sho)60-168708
Patent Document 3: Japanese Laid-Open Publication No. (Sho)61-115912
Patent Document 4: Japanese Laid-Open Publication No. (Sho)61-120816
Patent Document 5: Japanese Laid-Open Publication No. 2002-121231
Non-Patent Document 1: Satoh etc., "Biomass-derived heat-resistant alicyclic hydrocarbon polymers: poly(terpenes) and their hydrogenated derivatives," Green Chemistry, vol. 8, pp. 878-882 (2006)
Non-Patent Document 2: Keszler etc., "Synthesis of High Molecular Weight Poly(β-Pinene)," Advances in Polymer Science, vol. 100, pp. 1-9 (1992)

DISCLOSURE

Technical Problem

Therefore, it is an object of the present invention to provide β-pinene-based polymers with excellent heat resistance and light resistance, low absorptivity and high transparency, and their molded articles.

Technical Solution

Thus, the present invention relates to β-pinene-based polymers containing 50% by mass or more of β-pinene units, where the ratio of the proton integral value at 6 to 8 ppm to the total proton integral value in the $^1$H-NMR spectrum is $2.3 \times 10^{-5}$ or less, and the ratio of the proton integral value at 4.5 to 6 ppm to the total proton integral value is $2.8 \times 10^{-4}$ or less, and molded articles comprising the above polymers.

Further, the present invention relates to β-pinene-based polymers containing 50% by mass or more of β-pinene units, where the p-phenylene group content is 0.0055% by mass or less and the cyclohexene-1,4-diyl group content is 0.29% by mass or less, and molded articles comprising the above polymers.

In addition, the present invention relates to methods for preparing the above β-pinene-based polymers involving: hydrogenating the olefinic double bonds of the polymers containing 50% by mass or more of β-pinene units in the presence of a catalyst at a hydrogen pressure of 7 MPa or higher.

Advantageous Effects

The β-pinene-based polymers of the present invention have excellent heat resistance and light resistance, low absorptivity and high transparency, and thus may be appropriate for optics applications.

DETAILED DESCRIPTION

[I] β-Pinene-Based Polymers

Figure 1:
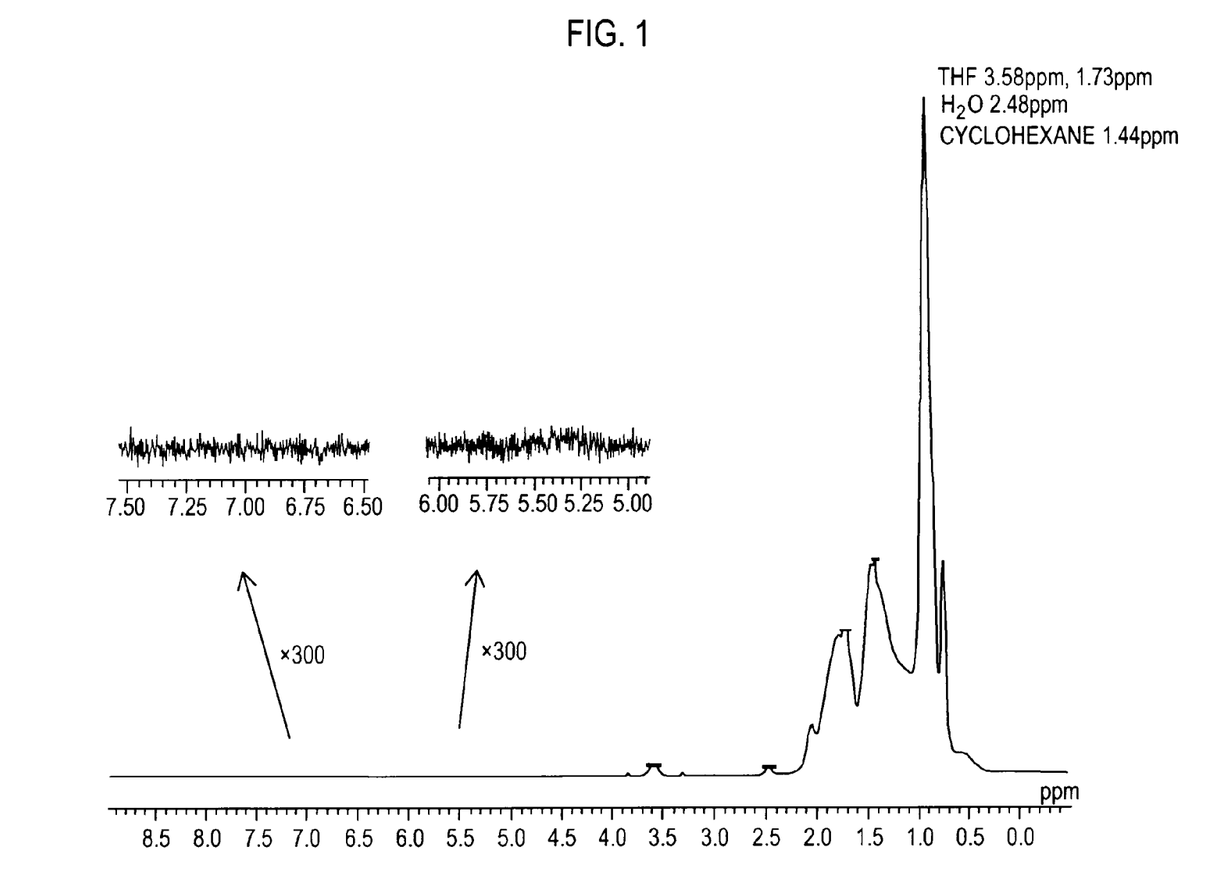
FIG. 1 is a $^1$H-NMR spectrum of the β-pinene-based polymer (H3) obtained in Example 3. Deuterated tetrahydrofuran was used as the deuterated solvent.
Figure 2:
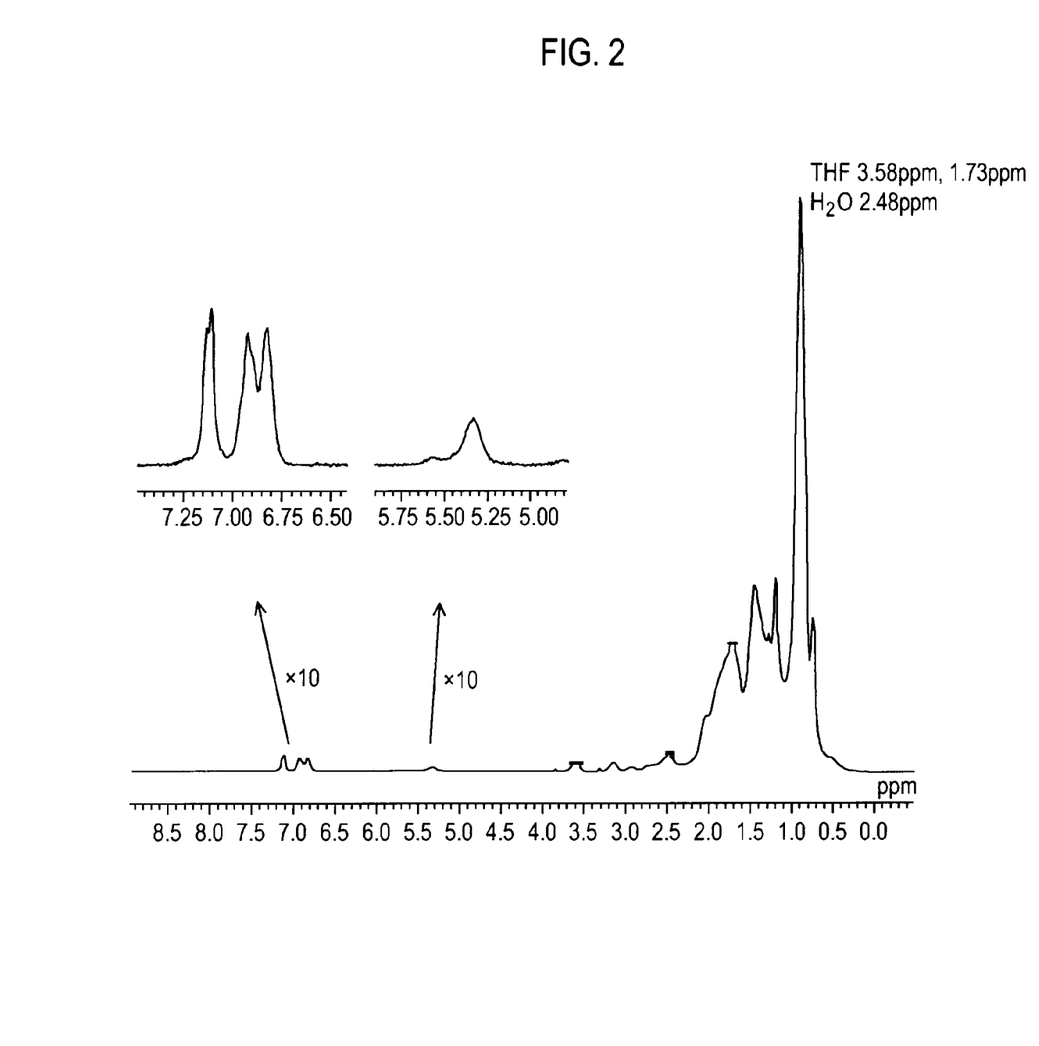
FIG. 2 is a $^1$H-NMR spectrum of the β-pinene-based polymer (B2) obtained in Comparative Example 2. Deuterated tetrahydrofuran was used as the deuterated solvent.

The β-pinene-based polymers of the present invention are polymers obtained by hydrogenating polymers that contain β-pinenes as a structure unit.

β-Pinenes

For the β-pinene monomers used herein, the well-known ones may be used. That is to say, those collected from plants such as pine trees or β-pinenes synthesized from other raw materials such as α-pinene may also be used.

Other Copolymerizable Monomers

The polymers of the present invention may also contain other monomer units copolymerizable with β-pinene, as a component. The copolymerizable monomers are not particularly limited, and the specific examples thereof include aromatic vinyls, such as styrene, α-methylstyrene, 3-methylstyrene, 4-methylstyrene, 4-ethylstyrene, 4-t-butylstyrene, 1-vinylnaphthalene and indene; (meth)acrylic monomers, such as (meth)acrylic acid, methyl (meth)acrylate, ethyl (meth)acrylate, butyl (meth)acrylate, 2-hydroxyethyl (meth)acrylate and glycidyl(meth)acrylate; maleic anhydride, maleic acid, fumaric acid, maleimide; nitrile group-containing vinyl monomers, such as acrylonitrile and methacrylonitrile; amide group-containing vinyl monomers, such as acrylamide and methacrylamide; olefins, such as ethylene, propylene, isobutylene, butadiene, isoprene and norbornene; turpentine-derived double bond-containing compounds other than β-pinene, such as limonene, α-pinene, myrcene, camphene and carene; vinyl esters, such as vinyl acetate, vinyl pivalate and vinyl benzoate; styrene derivatives having polar groups, vinyl chlorides, vinylidene chlorides, allylic chlorides, allylic alcohols and the like. Furthermore, they may also contain bifunctional monomers, such as p-divinyl benzene, p-diisopropenyl benzene, ethylene glycol divinyl ether, and the like. These can be used either alone or as a combination of two or more thereof.

When the above copolymerizable monomers are copolymerized with β-pinene, their copolymerized amounts are specifically from 0.001 to 50 mole %, more specifically from 0.01 to 20 mole %, most specifically from 0.01 to 10 mole %, per total monomer units of the polymers. When the copolymerized amount is too high, the polymerization may become difficult and the heat resistance is often decreased.

The structures of the copolymers are not particularly limited, and may also be any of, for example, random, block or tapered ones. Random copolymers are particularly desirable.

Number Average Molecular Weight

The number average molecular weights of the β-pinene-based polymers used herein are not particularly limited, but are specifically from 600 to 1,000,000 g/mole, more specifically from 10,000 to 500,000 g/mole, more specifically from 30,000 to 200,000 g/mole, most specifically from 40,000 to 200,000 g/mole, from the viewpoint of mechanical properties or processabilities. If the number average molecular weight is too small, it cannot be referred to as a polymer, whereas a too large number average molecular weight leads to difficulty in molding. Here, the number average molecular weight means the molecular weight reduced relative to polystyrene by gel permeation chromatography.

Hydrogenated Polymers

Although the polymers of the present invention are obtained by hydrogenation (hydrogen addition) of the olefinic double bonds derived from β-pinene units, in conventional hydrogenation reactions, aromatic rings are produced since the dehydrogenation reaction progresses simultaneously with the hydrogenation reaction. The β-pinene-based polymers of the present invention not only have very few olefinic double bonds, but also have a very low aromatic ring content.

The β-pinene-based polymers of the present invention have β-pinene-derived olefinic double bonds in amounts of specifically 1 mole % or less, more specifically 0.5 mole % or less, more specifically 0.2 mole % or less, based on the β-pinene units other than the produced aromatic ring units in the polymer, for the prevention of degradation by oxygen in air and the prevention of coloration of the molded articles. The β-pinene-based polymers of the present invention have a ratio of the proton integral value at 4.5 to 6 ppm to the total proton integral value (proton integral value at 4.5 to 6 ppm/total proton integral value) in their $^1$H-NMR spectrum [the protons of tetramethylsilane (TMS) are taken as 0 ppm] of $2.8 \times 10^{-4}$ or less (corresponding to the hydrogen addition rate of 99.5 mole % or more, in the case of β-pinene homopolymer), specifically $1.3 \times 10^{-4}$ or less (similarly, corresponding to the hydrogen addition rate of 99.8 mol % or more). Also, the cyclohexene-1,4-diyl group ($—C_6H_8—$) content is 0.29% by mass or less, specifically 0.12% by mass or less. When the above ratio is high, the amount of olefinic double bonds increases, which may cause easy degradation.

The β-pinene-based polymers of the present invention have aromatic rings coproduced in the hydrogenation of cyclohexene-1,4-diyl groups in amounts of 1 mole % or less, more specifically 0.1 mole % or less, more specifically 0.01 mole % or less, most specifically 0.005 mole % or less, based on the β-pinene units in the polymer, for the enhancement of heat resistance and light resistance. The β-pinene-based polymers of the present invention have a ratio of the proton integral value at 6 to 8 ppm to the total proton integral value (proton integral value at 6 to 8 ppm/total proton integral value) in their NMR spectrum [the protons of tetramethylsilane (TMS) are taken as 0 ppm] of specifically $2.3 \times 10^{-5}$ or less (0.01% or less of residual aromatics), more specifically $1.15 \times 10^{-5}$ or less (0.005% or less of residual aromatics). Also, the p-phenylene group ($—C_6H_4—$) content is 0.0055% by mass or less, specifically 0.0028% by mass or less. When the above ratio is high, the amount of aromatic rings increases, which may cause decreased heat resistance or lowered light transmittance.

Furthermore, since the $^1$H-NMR spectra of the polymers having a high hydrogenation degree integrate very small spectra, high SN ratio and resolution are required. Typically, it is desirable that nuclear magnetic resonance apparatuses having a magnet of 270 MHz or more are used and integration numbers are set at 8000 or more. When the SN ratio is poor or the resolution is low, accurate values cannot be obtained due to the underestimated integral values.

Also, deuterated solvents dissolving β-pinene-based polymers are not particularly limited, as long as the β-pinene-based polymers can be dissolved therein, but it is desirable to select deuterated solvents where the spectrum of undeuterated solvents in the deuterated solvents does not overlap with that of the β-pinene-based polymer or, even if when overlapping, deuterated solvents having a spectrum at 0 to 4 ppm and having little effect. Such deuterated solvents include deuterated tetrahydrofuran or deuterated hexane.

Glass Transition Temperature ($T_g$)

The $T_g$ of the β-pinene-based polymers of the present invention cannot be uniformly defined, depending on the type and ratio of copolymerized monomers, but may be specifically 70° C. to 250° C., more specifically 100° C. to 230° C. A low $T_g$ results in insufficient heat resistance, whereas too high a $T_g$ results in fragile β-pinene-based polymers. Also, $T_g$ may be measured by differential scanning calorimetry (DSC).

Total Light Transmittance

The β-pinene-based polymers of the present invention may be specifically those having high total light transmittance, particularly when they are used in optical materials. The total light transmittance of the β-pinene-based polymers may be specifically 80% or more, more specifically 85% or more. The total light transmittance is measured based on JIS-K-7361-1-1997 "Test Method of Total Light Transmittance of Plastics-Transparent Materials-Part 1: Single Beam Method."

Light Resistance

The β-pinene-based polymers of the present invention may be specifically those having high light resistance and weather resistance. For example, the accelerated exposure test using UVB light for 100 hours is performed based on ASTM-G53, and the yellowness ($\Delta YI$) before and after YI (yellow index) test which is measured based on JIS-K-7373 may be specifically 3 or less, more specifically 2 or less, more specifically 1 or less, most specifically 0.6 or less.

Heat Resistance

According to the present invention, polymers having a high 5% mass loss temperature can be obtained. The 5% mass loss temperature of the β-pinene-based polymers of the present invention is specifically 300° C. or higher, more specifically 350° C. or higher. A 5% mass loss temperature means the temperature where the mass is decreased by 5%, as measured by thermal gravimetric analysis (TGA) based on JIS-K-7120-1987 "Thermogravimetric Technique of Plastics."

[II] Method for Preparing β-Pinene-Based Polymers

Polymerization Reaction

The polymers containing β-pinene units may be obtained by well-known methods, such as cationic polymerization, radical polymerization and coordination polymerization. From the viewpoint of being able to easily practice industrially and obtaining a high molecular weight entity, cationic polymerization is particularly desirable.

Cationic Polymerization

Cationic polymerization can be controlled according to the solvent, the type and amount of the polymerization catalyst, polymerization initiator, electron donating compound, reaction temperature, reaction pressure, reaction time, etc.

Cationic Polymerization Solvent

The cationic polymerization used herein may be carried out by the well-known methods, as described in Non-patent documents 1 and 2, etc. Specifically, for example, it may be carried out by adding or contacting polymerization catalysts in inert organic solvents. The inert organic solvent may be used without particular limitation, so long as β-pinene and aromatic monomers are dissolved therein and it is inert to polymerization catalysts. Specifically, aromatic hydrocarbon-based solvents, such as benzene, toluene and xylene; aliphatic hydrocarbon-based solvents, such as pentane, hexane, heptane, octane, cyclopentane, cyclohexane, methylcyclohexane and decalin; halogenated hydrocarbon-based solvents, such as methyl chloride, methylene chloride, chloropropane, chlorobutane, 1,2-dichloroethane and 1,1,2-trichloroethylene; oxygen-containing solvents such as ester and ether, and the like may be used. Considering the reactivity, aromatic hydrocarbon-based solvents, aliphatic hydrocarbon-based solvents, halogenated hydrocarbon-based solvents and the like are desirable. These solvents can be used either alone or as a combination of two or more thereof.

When inert organic solvents are used in cationic polymerization, the amount of the inert organic solvents being used are not particularly limited, but are usually from 100 to 10000 parts by mass, specifically from 150 to 5000 parts by mass, more specifically from 200 to 3000 parts by mass, based on 100 parts by mass of β-pinene and aromatic monomers. When the amount of inert solvent is small, the viscosity of the produced polymers increases, making it difficult to stir, thereby resulting in a non-uniform reaction, leading to a failure to obtain uniform polymers or difficulty in controlling the reaction. On the other hand, large amounts of inert solvent result in reduced productivities.

Polymerization Catalyst

For the polymerization catalysts for cationic polymerization, acidic compounds may be used. The acidic compounds are not particularly limited, but include, for example, a Lewis acid or Bronsted acid. Specifically, they include halogen compounds of group IIIA to group VIII metals in the periodic table, such as $BF_3$, $BF_3OEt_2$, $BBr_3$, $BBr_3OEt_2$, $AlCl_3$, $AlBr_3$, $AlI_3$, $TiCl_4$, $TiBr_4$, $TiI_4$, $FeCl_3$, $FeCl_2$, $SnCl_2$, $SnCl_4$, $WCl_6$, $MoCl_5$, $SbCl_5$, $TeCl_2$, $EtMgBr$, $Et_3Al$, $Et_2AlCl$, $EtAlCl_2$, $Et_3Al_2Cl_3$ and $Bu_3SnCl$; hydroacids, such as HF, HCl and HBr; oxo acids, such as $H_2SO_4$, $H_3BO_3$, $HClO_4$, $CH_3COOH$, $CH_2ClCOOH$, $CHCl_2COOH$, $CCl_3COOH$, $CF_3COOH$, paratoluenesulfonic acid, $CF_3SO_3H$, $H_3PO_4$, and $P_2O_5$, and polymeric compounds, such as ion exchange resins containing such groups; heteropoly acids, such as phosphomolybdic acid and phosphotungstic acid; solid acids, such as $SiO_2$, $Al_2O_3$, $SiO_2$—$Al_2O_3$, $MgO$—$SiO_2$, $B_2O_3$—$Al_2O_3$, $WO_3$—$Al_2O_3$, $Zr_2O_3$—$SiO_2$, sulfated zirconia, zirconia tungstate, $H^+$ or rare earth element-exchanged zeolite, activated clay, clay acid, $\gamma$-$Al_2O_3$, and solid phosphoric acid on which $P_2O_5$ and diatomaceous earth are supported. These acidic compounds may be used in combination with each other, or other compounds may be added thereto. Other compounds are, for example, those which can enhance activities of the acidic compounds by the addition thereof. Examples of compounds that enhance the activities of the metal halide compounds as acidic compounds include alkyl metal compounds, such as MeLi, EtLi, BuLi, $Et_2Mg$, $(i-Bu)_3Al$, $Et_2Al(OEt)$, $Me_4Sn$, $Et_4Sn$ and $Bu_4Sn$.

Although it is difficult to uniformly define the amount of the polymerization catalysts used in cationic polymerization, since catalytic abilities vary depending on the type of polymerization catalysts, in the case of homogeneous catalysts, the amounts that are used are specifically from 0.001 to 10 parts by mass, more specifically from 0.01 to 5 parts by mass, most specifically from 0.01 to 1 parts by mass, based on 100 parts by mass of β-pinene and other copolymerizable monomers. In case of using heterogeneous catalysts, such as a solid acid or an ion exchange resin, in the polymerization catalyst, the amounts that are used are specifically from 0.1 to 10000 parts by mass, more specifically from 1 to 1000 parts by mass, based on 100 parts by mass of β-pinene and other copolymerizable monomers. Small amounts of the catalyst result in slow progress of cationic polymerization, whereas large amounts of catalyst are uneconomical.

The polymerization initiators for performing cationic polymerization are not particularly limited, so long as they are compounds that generate cations by the polymerization catalysts, but organic compounds having at least one functional groups represented by Formula I below may be advantageously used. For example, they include t-butyl chloride, t-butyl methyl ether, t-butyl methyl ester, t-butanol, 2,5-dichloro-2,5-dimethyl hexane, 2,5-dimethoxy-2,5-dimethyl hexane, 2,5-dimethyl-2,5-hexanediol, 2,5-dimethyl-2,5-hexanediol diacetate, cumyl chloride, cumyl methoxide, cumyl alcohol acetate, cumyl alcohol, p-dicumyl chloride, m-dicumyl chloride, p-dicumyl methoxide, p-dicumyl alcohol diacetate, p-dicumyl alcohol, 1,3,5-tricumyl chloride, 1,3,5-tricumyl methoxide and the like.

$$—C(—R^1)(—R^2)—X \quad (1)$$

(where $R^1$ represents hydrogen, alkyl group or aryl group, $R^2$ represents hydrogen, alkyl group or aryl group, and X represents halogen, alkoxy group, acyloxy group or hydroxyl group)

The amounts of the polymerization initiators used in cationic polymerization vary depending on the molecular weights of the desired polymers, and thus, are difficult to uniformly define, but are specifically from 0.001 to 10 parts by mass, more specifically from 0.001 to 5 parts by mass, most specifically from 0.01 to 1 parts by mass, based on 100 parts by mass of β-pinene and other copolymerizable monomers. Small amounts of the polymerization initiator result in a decreased polymerization reaction rate or the initiation of polymerization from impurities, preventing stable production. Large amounts of the polymerization initiator result in decreased molecular weights of the obtained polymer and more fragile polymers.

When cationic polymerization is carried out, the polymerization reaction can be further controlled by adding electron donating compounds. Such electron donating compounds include, for example, ether compounds such as diethyl ether, diisopropyl ether, tetrahydrofuran, dioxane and anisole, cyclic ether compounds having 2 to 10 carbon atoms, ester compounds such as ethyl acetate and butyl acetate, alcohol compounds such as methanol, ethanol and butanol, nitrogen-containing compounds such as triethylamime, diethylamine, pyridine, 2-methylpyridine, 2,6-di-t-butylpyridine, 2,6-lutidine, N,N-dimethylacetamide and acetonitrile, ammonium salts such as tetrabutyl ammonium chloride and tetrabutyl ammonium bromide, and the like.

The amount of the electron donating compounds in reaction system may be specifically from 0.01 to 500 parts by mass, more specifically from 0.1 to 200 parts by mass, based on 100 parts by mass of polymerization catalysts. When the amount of the electron donating compounds is too small, side reactions tend to increase and a lot of low molecular weight entities are produced, causing decreased strength of the obtained polymers. On the other hand, when there is too much electron donating compounds, the polymerization reaction rates are markedly suppressed, thereby requiring a long period of time for cationic polymerization, leading to decreased productivities. Therefore, the amount of the electron donating compounds may be more specifically from 0.1 to 100 parts by mass, based on the polymerization catalyst.

When the cationic polymerization is carried out, usually, the reaction temperature is specifically −120° C. to 60° C., more specifically −80° C. to 0° C., most specifically −40° C. to 0° C. Reaction temperatures that are too low are uneconomical, whereas too high reaction temperatures result in difficulty in controlling the reaction.

The reaction pressure for conducting cationic polymerization is not particularly limited, but may be specifically from 0.5 to 50 atm, more specifically from 0.7 to 10 atm. Typically, cationic polymerization is performed at around 1 atm.

The reaction time for conducting cationic polymerization is not particularly limited, and may be appropriately determined according to conditions, such as the type and amount of the aromatic monomers being used, the type or amount of the polymerization catalyst, the reaction temperature, the reaction pressure and the like. The reaction time is typically from 0.01 hours to 24 hours, specifically from 0.1 hours to 10 hours.

After the cationic polymerization, polymers can be obtained by separation from reaction mixtures according to conventional techniques used for isolating a polymer from a solution, such as reprecipitation, removal of solvent under heating, removal of solvent under reduced pressure, removal of solvent by water vapor (steam stripping), etc.

[III] Hydrogenation

The hydrogenated β-pinene-based polymers according to the present invention may be obtained by a hydrogenation reaction, but the hydrogenation method is not particularly limited and may be performed using any well-known methods.

Hydrogenation Catalysts

As the catalysts used for carrying out the hydrogenation reaction, those capable of hydrogenating olefin compounds or aromatic compounds may be used. Typically, heterogeneous catalysts or homogeneous catalysts are used.

Heterogeneous Catalysts

The catalysts used in carrying out the hydrogenation reaction by using heterogeneous catalysts are not particularly limited, but specific examples thereof include sponge metal catalysts such as sponge nickel, sponge cobalt and sponge copper; and supported metal catalysts such as nickel silica, nickel alumina, nickel zeolite, nickel diatomaceous earth, palladium silica, palladium alumina, palladium zeolite, palladium diatomaceous earth, palladium carbon, palladium calcium carbonate, platinum silica, platinum alumina, platinum zeolite, platinum diatomaceous earth, platinum carbon, platinum calcium carbonate, ruthenium silica, ruthenium alumina, ruthenium zeolite, ruthenium diatomaceous earth, ruthenium carbon, ruthenium calcium carbonate, iridium silica, iridium alumina, iridium zeolite, iridium diatomaceous earth, iridium carbon, iridium calcium carbonate, cobalt silica, cobalt alumina, cobalt zeolite, cobalt diatomaceous earth, cobalt carbon and cobalt calcium carbonate.

These catalysts may also be denatured with iron, molybdenum, magnesium and the like for purposes of enhancing activity, selectivity, and stability. Furthermore, these catalysts may be used either alone or as mixtures thereof.

Homogeneous Catalysts

The catalysts used in carrying out hydrogenation reaction by using homogeneous catalysts are not particularly limited, but specific examples thereof include catalysts composing of transition metal compounds and alkyl alluminiums or alkyl lithiums. Specific examples of transition metal compounds include nickel salts such as nickel acetate, nickel octylate and nickel acetylacetonate, cobalt salts such as cobalt acetate, cobalt octylate and cobalt acetylacetonate, titanocene dichloride, zirconocene dichloride, and the like. Specific examples of alkyl aluminiums include trimethyl aluminium, triethyl aluminium, triisobutyl aluminium, trioctyl aluminium, etc. Specific examples of alkyl lithiums include methyl lithium, ethyl lithium, n-butyl lithium, sec-butyl lithium, t-butyl lithium and the like.

The homogeneous catalysts may be used either alone or as mixtures thereof. Further, they may be used as mixtures with heterogeneous catalysts.

When the hydrogenation reaction is carried out, because the polymers are hydrogenated, the reaction activities compared to that towards low-molecular compounds usually decrease. Accordingly, relatively high temperature and high pressure are often favored for the reaction conditions, and it is desirable to use heterogeneous catalysts having high thermal stability. In terms of hydrogenation activity, it is desirable to use nickel or palladium for the metals having hydrogenation activities, more specifically palladium compounds. Furthermore, in order to prevent the undesired side reactions which develop during the hydrogenation, specifically calcium carbonate or carbon supports, more specifically carbon supports may be used.

Solvents

When the hydrogenation reaction is carried out, it is usually conducted in an organic solvent. The solvents which can be used herein are not particularly limited, but it is desirable to use those that easily dissolve polymers. Although it is difficult to define the solvents since different solvents are used according to the copolymerized monomers, the specific examples thereof include aromatic hydrocarbon-based solvents such as benzene, toluene and xylene; aliphatic hydrocarbon-based solvents such as pentane, hexane, heptane, octane, cyclopentane, cyclohexane, methylcyclohexane, decalin and tricyclodecane; halogenated hydrocarbon-based solvents such as methyl chloride, methylene chloride, chloropropane, chlorobutane, 1,2-dichloroethane and 1,1,2-trichloroethylene; ester-based solvents such as ethyl acetate and butyl acetate; ether-based solvents such as dioxane, tetrahydrofuran, diethyl ether, diisopropyl ether, dibutyl ether; alcohol-based solvents such as methanol, ethanol, 1-propanol, 2-propanol and 1-butanol; and the like.

When the hydrogenation reaction is carried out, the solvents used in polymerization process may be used directly or may be used after some solvents are removed therefrom by methods such as distillation, etc. Further, the solvent may be used once the polymers are withdrawn therefrom by the above methods, after the polymerization process is terminated. When unhydrogenated polymers are introduced into the hydrogenation process by the above method, the solvent of the polymerization process may be used directly or may be used after some solvents are removed therefrom, with dilution with extra solvents.

The amount of organic solvents used in carrying out the hydrogenation reaction is 1% by mass or more and 30% by mass or less, as the polymer concentration. Using an organic solvent amount of 1% by mass or less results in markedly decreased productivity, whereas using an organic solvent amount of 30% by mass or more results in increased solution viscosity, leading to decreased mixing efficiency.

Reaction Pressure

When the hydrogenation reaction is carried out, the pressure of the hydrogenation reaction cannot always be defined since the suitable pressure may differ depending on the catalysts being used, but typically, it is from 0.1 MPa to 50 MPa, specifically from 0.5 MPa to 30 MPa, more specifically from 1 MPa to 20 MPa, as the total pressure for the hydrogenation reaction.

The present invention is characterized as hydrogenating olefinic double bonds, as well as aromatic rings coproduced by conventional methods, to a high degree, and thus, it is desirable to carry out the reaction at high reaction rates. Generally, the higher the partial pressure of hydrogen gas is, the better it is for hydrogenation, and thus, it is desirable to carry out the reaction at 7 MPa or more. 50 MPa or more is undesirable, since the cost for equipments to raise pressure and pressure-resistant structured equipments increase.

Although the hydrogenation reaction is carried out under conditions where hydrogen gas exists, it is also possible to perform the reaction by mixing with any gases other than hydrogen gas, as long as they are inert to hydrogenation reactions. Specific examples of inert gas include nitrogen, helium, argon, carbon dioxide and the like. Also, depending on the reaction conditions, although the solvent used in the reaction may have a partial pressure of a significant ratio as a gas component, it is acceptable.

Reaction Temperature and Reaction Time

When the hydrogenation reaction is carried out, the temperature of the hydrogenation reaction cannot always be defined since the suitable temperature may differ depending on the catalysts being used, but typically, it is from 10° C. to 300° C., specifically from 60° C. to 250° C., more specifically from 70° C. to 220° C. Generally, heterogeneous catalysts may be used at higher temperatures, as compared with homogeneous catalysts. The reaction time for hydrogenation cannot always be defined since it may vary depending on the type and amount of the catalysts being used and the reaction temperature, but is usually from 5 minutes to 20 hours, specifically from 10 minutes to 15 hours. Reaction times that are too short result in a failure to achieve the desired hydrogenation degree. On the other hand, reaction times that are too long result in a noticeable increase in unwanted side reactions, which may lead to a failure to obtain hydrogenation polymers having the desired physical properties.

Embodiments

When the hydrogenation reaction is carried out, the hydrogenation reaction can be performed by using any well-known methods. Although suitable reaction forms may vary according to the type of catalysts being introduced, for example, batchwise reactions, semicontinuous reactions or continuous reaction forms may be used. For continuous reaction forms, plug flow reactors (PFR) or continuous stirred tank reactors (CSTR) may be used. Also, in case of using heterogeneous catalysts, fixed-bed reactors may be used. When the reaction is carried out by intensive mixing, methods of mixing by stirring or mixing by circulating hydrogenation reaction solutions in a loop form, etc, may be used. In this case, when heterogeneous catalysts are used, it becomes a suspension-bed reaction and a gas-liquid-solid 3-phase reaction field. Further, when homogeneous catalysts are used, it becomes a gas-liquid 2-phase based reaction field.

After the hydrogenation reaction, some part of reaction solution may be separated in order to be reused in the hydrogenation reaction. By reusing them, the localization of heat generation caused by hydrogenation may be avoided or the hydrogenation reaction degree may be enhanced.

In any of these reaction forms, the hydrogenation reaction may be carried out by joining the same or different, two or more reaction forms. When a higher degree of hydrogenation reaction is the goal, it may be desirable to include the process of reacting in a plug flow form using fixed-beds.

Although it is difficult to define the amounts of the catalyst used since they vary depending on the type of the hydrogenation catalyst used, the polymer concentration, the reaction form, etc., usually, in case of conducting the reaction in a suspension-bed using heterogeneous catalysts, the amount of catalyst used per 100 parts by mass of hydrogenation reaction solution is usually from 0.01 to 20 parts by mass, specifically from 0.05 to 15 parts by mass, more specifically from 0.1 to 10 parts by mass. Small amounts of catalyst require a long reaction time for hydrogenation, whereas large amounts require a lot of power for mixing the heterogeneous catalysts. Also, in case of using a fixed-bed, it is difficult to define the amount of catalysts used per reaction solution, and any amounts may be used. In addition, when homogeneous catalysts are used, the concentration of transition metal compound in the hydrogenation reaction solution may be from 0.001 mmol/l to 100 mmol/l, more specifically from 0.01 mmol/l to 10 mmol/l.

The used hydrogenation catalysts may be separated with the polymers, as needed, after the hydrogenation reaction is terminated. Although the separation may be conducted by any well-known methods, in case of using heterogeneous catalysts, the separation may be performed by continuous or batchwise filtration, centrifugation, stationary sedimentation or decantation.

In case of using homogeneous catalysts, for example, separation with the catalysts may be performed by using coagulation sedimentation, adsorption, washing, aqueous phase extraction and the like.

However, even if the catalysts are separated by using the above separation methods, trace amounts of metal components may remain in the polymer. In this case, metal components are also dissolved therein, and thus, the residual metal may be separated by using coagulation sedimentation, adsorption, washing, aqueous phase extraction and the like, as described above.

The catalysts recovered by separation may be reused in the hydrogenation reaction, after some are removed therefrom or some new catalysts may be added thereto, as needed.

After the hydrogenation, β-pinene-based polymers can be obtained by separation from reaction mixtures according to conventional techniques used for isolating a polymer from a solution, such as reprecipitation, removal of solvent under heating, removal of solvent under reduced pressure, removal of solvent by water vapor (steam stripping), etc.

The β-pinene-based polymers of the present invention may be used either alone or as compositions combined with other polymers such as polyamide, polyurethane, polyester, polycarbonate, polyoxymethylene resin, acrylic resin, polyvinyl alcohol, ethylene-vinyl alcohol copolymer, polyolefin, polystyrene, styrene-based block copolymer and the like. When used as compositions, any components including various additives such as stabilizers, lubricating agents, pigments, impact resistance improvers, processing aids, stiffeners, coloring agents, flame retardants, weather resistance improvers, ultraviolet absorbers, antioxidants, fungicides, antibacterial agents, light stabilizers, antistatic agents, silicone oils, antiblocking agents, release agents, foaming agents and fragrances; various fibers such as glass fibers and polyester fibers; fillers such as talcs, micas, montmorillonites, smectites, silicas and wood powders; various coupling agents; and the like may be combined therewith, as needed.

[IV] Molded Articles

The molded articles comprising the β-pinene-based polymers of the present invention may be obtained by conventional methods. As the molding methods, well-known methods such as injection molding method, hot press molding method, extrusion moding method, cutting work method, method of using UV or EB curable resins, and the like may be appropriately selected. Among these, from the standpoint of productivity, injection molding methods, hot press molding methods and extrusion molding methods may be advantageously used.

Optical Materials

The β-pinene-based polymers of the present invention may be used in various optical materials and their scope is not particularly limited, but it is desirable to use them in optical materials requiring excellent heat resistance, low absorptivity and high transparency. Optical materials include, for example, lenses, nonspherical lenses, Fresnel lenses, silver salt camera lenses, digital electronic camera lenses, video camera lenses, projector lenses, copy machine lenses, cellphone camera lenses, eyeglasses lenses, nonspherical pickup lenses for digital optical disc apparatuses using blue light emitting diode, rod lenses, rod lens arrays, microlenses, microlens arrays, various lens arrays, optical fibers such as step index, gradient index, single mode, multicore, polarization preserving and side light optical fibers, optical fiber connectors, adhesives for optical fibers, digital optical discs (compact discs, magnetic optical discs, digital discs, video discs, computer discs, light guides, light diffusing molded articles, functional thin films having functions, such as alternative films of glass substrate for liquid crystal, phase difference films, antistatic layers, antireflective layers, hard coating layers, transparent conductive layers, anti-glare layers, antireflective films for flat-panel display, substrates for touch panel, transparent conductive films, anti-reflective films, antiglare films, substrates for electronic paper, substrates for organic electroluminescence, front face protective plate for plasma display, electromagnetic wave shielding plate for plasma display, front face protective plates for field-emission display, light guide plates diffusing specific regions of light to the fore using piezoelectronic elements, prisms constructing light polarizer or analyzer, etc., diffraction gratings, endoscopes, endoscopes waveguiding high energy laser, mirrors or half mirrors for camera represented by Dach mirror, transparent materials used in vehicle lamp fitting (such as, headlight lenses for automobiles, headlight reflectors for automobiles), front face protective plates for photovoltaic cell, window glasses for home, window glasses for transportations (automobiles, electric trains, ships, airplanes, spaceships, space stations, artificial satellites, etc.), anti-reflective films for window glass, dust proofing films on semiconductor exposure, protective films for electrophotographic sensitive materials, sealing materials for semiconductor (EPROM, etc.) capable of writing or rewriting by ultraviolet, light emitting diode sealing materials, ultraviolet light emitting diode sealing materials, white light emitting diode sealing materials, SAW filters, optical band pass filters, second harmonic wave generators, Kerr effect generators, light switches, light interconnections, optical isolators, light waveguides, surface emitting body elements using organic electroluminescence, surface emitting body elements in which semiconductor particles are dispersed, phosphors in which fluorescent materials are dissolved or dispersed, and the like.

Light Guides

Light guides are those that can be formed in various well-known shapes, for example, they may be various forms of plates, blocks, rods, crooks, curves, etc., and also include those where dots are attached on at least one sides thereof by screen printing or linear patterns such as V-groove, concavoconvex on hemispherical lenses, and pleated patterns formed on the surface thereof.

Light Diffusing Molded Articles

Light diffusing molded articles are obtained by combining the above β-pinene-based polymers with light diffusing agents as the conventional ones, and then molding the obtained light diffusing compositions into molded articles in the form of plates or blocks, etc.

Functional Thin Films

Functional thin films which are formed by coating on at least one side of a substrate of the β-pinene-based polymers are not particularly limited, but may be specifically those having functions such as antistatic layers, antireflective layers, hard coating layers, transparent conductive layers and anti-glare layers.

Optical Films

Optical films using the β-pinene-based polymers may be advantageously used in polarizing plate protective films, in particular.

Methods for molding the above optical films are not particularly limited, but may include, for example, various conventional methods such as casting methods or melt extrusion methods. Among these, melt extrusion methods which do not use solvents may be advantageously used from the standpoint of earth's environment, working environment or manufacturing costs. Further, in order to enhance optical functions such as phase difference, casting methods may also be advantageously used.

Lens Sheets

Lens sheets refer to those having functions such as changing the direction of the light irradiated thereto, light condensing, refracting, reflecting and dispersing, in the lens section composed of the lens group consisting of one or more lens shapes that are formed on at least one side of the principal sheet face. Also, these lens sheets generally include those referred to as prism sheets, Fresnel lens sheets, lenticular lens sheets, microlens array sheets and the like.

Plastic Lenses

Plastic lenses mean plastic molded articles having a lens function and are not particularly limited, but include various lenses such as eyeglasses lenses, camera lenses, binocular lenses, microscope lenses, projector lenses, fθ lenses, pickup lenses and the like.

Lamp Fittings for Vehicles

The "lamp fitting" of lamp fittings for vehicles are used as those having at least a light source and a lamp cover, and "vehicle" is used as those having the meaning of vehicles in a broad sense, such as two-wheel automobiles, three-wheel automobiles, four-wheel automobiles, other automobiles, railroad vehicles, forklifts, other industrial vehicles and the like. Also, "vehicle lamp fitting" means lamp fittings for lighting, identifying or indicating, which are fitted in the above various vehicles, and include, without particular limitation, head lamps, tail lamps, stop lamps, directional lights (so-called, winkers), width indicators, backing lights and the like.

Medical Equipments

Examples of medical equipments include, for example, containers for liquid, powder or solid medicine, such as injectable liquid-medicine containers, ampules, pre-filled syringes, transfusion bags, solid-medicine containers, eyedrop containers and drop containers; sample containers such as sampling tubes for blood tests, blood collection tubes and analyte containers; sterile containers for medical materials such as surgical knives, surgical tweezers (forceps), gauzes, contact lenses; medical instruments such as injectors; medical experimental instruments such as beakers, petri dishes and flasks; optical components such as plastic lenses for medical test; plumbing materials for medical transfusion tubes, plumbings, joints and valves; artificial organs such as denture base, prosthetic hearts, artificial tooth roots, or their components, and the like.

Although embodiments of the present invention are described above, the present invention is not limited to the specific examples described above. Further, the exemplified materials may be either used alone or in combination with each other, unless indicated otherwise.

EXAMPLES

Although the present invention is described in more detail by the examples provided below, the present invention is not limited to those examples.

Reference Example 1

A sufficiently dried flask equipped with a glass stopper was sufficiently purged with nitrogen, and then, 1100 parts by mass of anhydrous N-hexane, 1100 parts by mass of anhydrous methylene chloride, 40 parts by mass of β-pinene purified by distillation and 4.5 parts by mass of anhydrous triethylamine were added thereto, followed by cooling to −78° C. Further, while stirring at −78° C., 70 parts by mass of 1.0 mol/l hexane solution of ethylalluminium dichloride was added thereto to initiate polymerization. After the polymerization was carried out for 10 minutes, 10 parts by mass of methanol was added thereto to terminate the polymerization. Thereafter, methylene chloride was removed therefrom under reduced pressure at room temperature, followed by an addition of the aqueous solution in which 20 parts by mass of citric acid was added to 800 parts by mass of distilled water and stirring for 30 minutes. The aqueous layer was removed, and the organic layer was washed with distilled water until it was neutralized to remove the catalyst therefrom. The methylcyclohexane layer thus obtained was subject to reprecipitation in 10000 parts by mass of mixed solvent of methanol/acetone (60/30 volume %), and sufficiently dried to obtain 39 parts by mass of β-pinene polymer (A1). The resulting β-pinene polymer (A1) had a weight average molecular weight of 53,000 and a number average molecular weight of 32,000.

Reference Example 2

A sufficiently dried pressure vessel equipped with a stirrer was sufficiently purged with nitrogen, and then, 1100 parts by mass of anhydrous N-hexane, 1100 parts by mass of anhydrous methylene chloride, 32 parts by mass of β-pinene purified by distillation, 8 parts by mass of isobutylene and 4.5 parts by mass of anhydrous triethylamine were added thereto, followed by cooling to −78° C. Further, while stirring at −78° C., 70 parts by mass of 1.0 mol/l hexane solution of ethylalluminium dichloride was added thereto to initiate polymerization. After the polymerization was carried out for 10 minutes, 10 parts by mass of methanol was added thereto to terminate the polymerization. Thereafter, methylene chloride was removed therefrom under reduced pressure at room temperature, followed by an addition of the aqueous solution in which 20 parts by mass of citric acid was added to 800 parts by mass of distilled water and stirring for 30 minutes. The aqueous layer was removed, and the organic layer was washed with distilled water until it was neutralized to remove the catalyst therefrom. The methylcyclohexane layer thus obtained was subject to reprecipitation in 10000 parts by mass of mixed solvent of methanol/acetone (60/30 volume %), and sufficiently dried to obtain 39 parts by mass of β-pinene/ isobutylene copolymer (A2). The β-pinene/isobutylene copolymer (A2) had a β-pinene content of 81% by mass and an isobutylene content of 19% by mass, as measured by $^1$H-NMR. The resulting β-pinene/isobutylene copolymer (A2) had a weight average molecular weight of 45,000 and a number average molecular weight of 28,100.

Reference Example 3

A sufficiently dried flask equipped with a glass stopper was sufficiently purged with nitrogen, and 184 parts by mass of anhydrous N-hexane, 210 parts by mass of anhydrous methylene chloride and 0.5 parts by mass of anhydrous diethyl ether were added thereto, followed by cooling to −78° C. Further, while stirring at −78° C., 7.2 parts by mass of 1.0 mol/l hexane solution of ethylaluminium dichloride was added thereto. Further, while maintaining at −78° C., 3.0 parts by mass of 0.1 mol/l hexane solution of p-dicumyl chloride was added thereto, and the color of the reaction solution changed to reddish orange. 60 parts by mass of β-pinene purified by distillation was immediately added thereto over 1 hour, where the color of the reaction solution gradually turned to deep orange and the viscosity of the solution increased. After the addition of β-pinene was completed, 30 parts by mass of methanol was added thereto to terminate the reaction. The aqueous solution in which 5 parts by mass of citric acid was added to 100 parts by mass of distilled water was added thereto, and stirred for 5 minutes. The aqueous layer was removed, and the organic layer was washed with distilled water until it was neutralized to remove the aluminium compound therefrom. The organic layer thus obtained was subject to reprecipitation in 5000 parts by mass of mixed solvent of methanol/acetone (60/40 volume %), and sufficiently dried to obtain 60 parts by mass of β-pinene polymer (A3). The resulting β-pinene polymer (A3) had a weight average molecular weight of 116,000, a number average molecular weight of 51,000 and a glass transition temperature of 95° C.

Example 1

127 parts by mass of cyclohexane, and 25 parts by mass of β-pinene polymer (A1) obtained in Reference Example 1 were put into the nitrogen-purged pressure vessel equipped with a stirrer, and stirred to thoroughly dissolve the β-pinene polymer (A1). Thereafter, as the hydrogenation catalyst, 7.5 parts by mass of 5% palladium-supported carbon (product number: E1002NN/W, manufactured by Evonik Degussa Japan Co. Ltd.) was added thereto, sufficiently dispersed with stirring, and then, the inside of the pressure vessel was sufficiently purged with hydrogen, and the reaction was carried out while stirring at a temperature of 130° C. and a hydrogen pressure of 15 MPa for 25 hours, followed by a return to ambient pressure. Subsequently, the reaction solution was filtered through a 0.5 μm Teflon (registered trademark) filter to separate and remove the catalyst, reprecipitated in 3000 parts by mass of a mixed solvent of methanol/acetone (60/40 volume %), and then sufficiently dried to obtain 24 parts by mass of β-pinene-based polymer (H1). The β-pinene-based polymer (H1) thus obtained had 0.023 mole % of residual olefinic double bonds and 0.0027 mole % of residual aromatic rings, as measured by $^1$H-NMR. The glass transition temperature was 132° C. Also, the ratio of the proton integral value at 6 to 8 ppm to the total proton integral value in $^1$H-NMR was 5.9×10$^{-6}$, and the ratio of the proton integral value at 4.5 to 6 ppm to the total proton integral value was 1.3×10$^{-5}$. The resulting β-pinene-based polymer (H1) had a weight average molecular weight of 53,300 and a number average molecular weight of 32,400.

Example 2

127 parts by mass of cyclohexane, and 25 parts by mass of β-pinene/isobutylene copolymer (A2) obtained in Reference Example 2 were put into the nitrogen-purged pressure vessel equipped with a stirrer, and stirred to thoroughly dissolve the β-pinene/isobutylene copolymer (A2). Thereafter, as the hydrogenation catalyst, 7.5 parts by mass of 5% palladium-supported carbon (product number: E1002NN/W, manufac- tured by Evonik Degussa Japan Co. Ltd.) was added thereto, sufficiently dispersed with stirring, and then, the inside of the pressure vessel was sufficiently purged with hydrogen, and the reaction was carried out while stirring at a temperature of 130° C. and a hydrogen pressure of 15 MPa for 25 hours, followed by a return to ambient pressure. Subsequently, the reaction solution was filtered through a 0.5 μm Teflon (registered trademark) filter to separate and remove the catalyst, reprecipitated in 3000 parts by mass of a mixed solvent of methanol/acetone (60/40 volume %), and then sufficiently dried to obtain 24 parts by mass of β-pinene-based polymer (H2). The β-pinene-based polymer (H2) thus obtained had 0.026 mole % of residual olefinic double bonds and 0.0015 mole % of residual aromatic rings, based on total units, as measured by $^1$H-NMR. The glass transition temperature was 95° C. Also, the ratio of the proton integral value at 6 to 8 ppm to the total proton integral value in $^1$H-NMR was 4.7×10$^{-6}$, and the ratio of the proton integral value at 4.5 to 6 ppm to the total proton integral value was 1.0×10$^{-5}$. The resulting β-pinene-based polymer (H2) had a weight average molecular weight of 53,300 and a number average molecular weight of 32,400.

Example 3

β-pinene-based polymer (H3) was obtained in the same manner as described in Example 1, with the exception that β-pinene polymer (A3) obtained in Reference Example 3 was used instead of β-pinene polymer (A1). The β-pinene-based polymer (H3) had 0.023 mole % of residual olefinic double bonds and 0.0027 mole % of residual aromatic rings, as measured by $^1$H-NMR. The glass transition temperature was 132° C. Also, the ratio of the proton integral value at 6 to 8 ppm to the total proton integral value in $^1$H-NMR was 5.9×10$^{-6}$, and the ratio of the proton integral value at 4.5 to 6 ppm to the total proton integral value was 1.3×10$^{-5}$. The resulting β-pinene-based polymer (H3) had a weight average molecular weight of 103,400 and a number average molecular weight of 45,400. The evaluation results of the β-pinene-based polymer (H3) are shown in Table 1 below.

Comparative Example 1

127 parts by mass of cyclohexane and 25 parts by mass of β-pinene polymer (A1) obtained above were put into the nitrogen-purged pressure vessel equipped with a stirrer, and stirred to thoroughly dissolve the β-pinene polymer (A1). Thereafter, as the hydrogenation catalyst, 7.5 parts by mass of 5% palladium-supported alumina powder (manufactured by N.E. CHEMCAT CORPORATION) was added thereto, sufficiently dispersed with stirring, and then, the inside of the pressure vessel was sufficiently purged with hydrogen, and the reaction was carried out while stirring at a temperature of 160° C. and a hydrogen pressure of 6 MPa for 25 hours, followed by a return to ambient pressure. Subsequently, the reaction solution was filtered through a 0.5 μm Teflon (registered trademark) filter to separate and remove the catalyst, reprecipitated in 3000 parts by mass of a mixed solvent of methanol/acetone (60/40 volume %), and then sufficiently dried to obtain 24 parts by mass of β-pinene-based polymer (B1). The β-pinene-based polymer (B1) thus obtained had 1.7 mole % of residual olefinic double bonds and 0.4 mole % of residual aromatic rings, as measured by $^1$H-NMR. The glass transition temperature was 129° C. Also, the ratio of the proton integral value at 6 to 8 ppm to the total proton integral value in $^1$H-NMR was 9.1×10$^{-4}$, and the ratio of the proton integral value at 4.5 to 6 ppm to the total proton integral value was $9.7 \times 10^{-4}$. The resulting β-pinene-based polymer (B1) had a weight average molecular weight of 51,900 and a number average molecular weight of 31,600.

Comparative Example 2

27 parts by mass of cyclohexane, 1 part by mass of isopropanol and 12 parts by mass of β-pinene polymer (A1) obtained above were put into the nitrogen-purged pressure vessel equipped with a stirrer, and stirred to thoroughly dissolve the β-pinene polymer (A1). Thereafter, as the hydrogenation catalyst, 7 parts by mass of 36.6 mass % nickel-supported alumina (product number: N163A, manufactured by Nikki Chemical Co. Ltd.) was added thereto, sufficiently dispersed with stirring, and then, the inside of the pressure vessel was sufficiently purged with hydrogen, and the reaction was carried out while stirring at a temperature of 150° C. and a hydrogen pressure of 20 MPa for 30 minutes, followed by a return to ambient pressure. Subsequently, the reaction solution was filtered through a 0.5 μm Teflon (registered trademark) filter to separate and remove the catalyst, reprecipitated in 3000 parts by mass of a mixed solvent of methanol/acetone (60/40 volume %), and then sufficiently dried to obtain 11 parts by mass of β-pinene-based polymer (B2). The β-pinene-based polymer (B2) thus obtained had 6.5 mole % of residual olefinic double bonds and 6.3 mole % of residual aromatic rings, as measured by $^1$H-NMR. The glass transition temperature was 124° C. Also, the ratio of the proton integral value at 6 to 8 ppm to the total proton integral value in $^1$H-NMR was $1.4 \times 10^{-2}$, and the ratio of the proton integral value at 4.5 to 6 ppm to the total proton integral value was $3.7 \times 10^{-3}$. The resulting β-pinene-based polymer (B2) had a weight average molecular weight of 52,000 and a number average molecular weight of 31,200. The evaluation results of the β-pinene-based polymer (B2) are shown in Table 1 below.

Comparative Example 3

103 parts by mass of cyclohexane, and 45 parts by mass of β-pinene polymer (A3) obtained in Reference Example 3 were put into the nitrogen-purged pressure vessel equipped with a stirrer, and stirred to thoroughly dissolve the β-pinene polymer (A3). Thereafter, as the hydrogenation catalyst, 0.5 parts by mass of 5 mass % palladium-supported carbon (product number: E106O/W, manufactured by Evonik Degussa Japan Co. Ltd.) was added thereto, sufficiently dispersed with stirring, and then, the inside of the pressure vessel was sufficiently purged with hydrogen, and the reaction was carried out while stirring at a temperature of 200° C. and a hydrogen pressure of 3 MPa for 9 hours, followed by a return to ambient pressure. Subsequently, the reaction solution was filtered through a 0.5 μm Teflon (registered trademark) filter to separate and remove the catalyst, reprecipitated in 3000 parts by mass of a mixed solvent of methanol/acetone (60/40 volume %), and then sufficiently dried to obtain 42 parts by mass of β-pinene-based polymer (B3). The β-pinene-based polymer (B3) thus obtained had 13.7 mole % of residual olefinic double bonds and 7.2 mole % of residual aromatic rings, as measured by $^1$H-NMR. The glass transition temperature was 122° C. Also, the ratio of the proton integral value at 6 to 8 ppm to the total proton integral value in $^1$H-NMR was $1.4 \times 10^{-2}$, and the ratio of the proton integral value at 4.5 to 6 ppm to the total proton integral value was $7.9 \times 10^{-3}$. The resulting β-pinene-based polymer (B3) had a weight average molecular weight of 110,000 and a number average molecular weight of 50,300. The evaluation results of the β-pinene-based polymer (B3) are shown in Table 1 below.

Comparative Example 4

27 parts by mass of cyclohexane, 1 part by mass of isopropanol and 3.0 parts by mass of β-pinene polymer (B3) obtained in Comparative Example 3 were put into the nitrogen-purged pressure vessel equipped with a stirrer, and stirred to thoroughly dissolve the β-pinene polymer (B3). Thereafter, as the hydrogenation catalyst, 1.8 parts by mass of 36.6 mass % nickel-supported alumina (product number: N163A, manufactured by Nikki Chemical Co. Ltd.) was added thereto, sufficiently dispersed with stirring, and then, the inside of the pressure vessel was sufficiently purged with hydrogen, and the reaction was carried out while stirring at a temperature of 200° C. and a hydrogen pressure of 3 MPa for 6 hours, followed by a return to ambient pressure. Subsequently, the reaction solution was filtered through a 0.5 μm Teflon (registered trademark) filter to separate and remove the catalyst, reprecipitated in 300 parts by mass of a mixed solvent of methanol/acetone (60/40 volume %), and then sufficiently dried to obtain 2.7 parts by mass of β-pinene-based polymer (B4). The β-pinene-based polymer (B4) thus obtained had 0.5 mole % of residual olefinic double bonds and 3.4 mole % of residual aromatic rings, as measured by $^1$H-NMR. The glass transition temperature was 129° C. Also, the ratio of the proton integral value at 6 to 8 ppm to the total proton integral value in $^1$H-NMR was $7.7 \times 10^{-3}$, and the ratio of the proton integral value at 4.5 to 6 ppm to the total proton integral value was $2.7 \times 10^{-4}$. The resulting β-pinene-based polymer (B4) had a weight average molecular weight of 100,000 and a number average molecular weight of 43,700. The evaluation results of the β-pinene-based polymer (B4) are shown in Table 1 below.

Reference Example 4

Preparation of Hydrogenation Catalyst 29.2 ml of a solution in which triisobutyl aluminium (manufactured by Tosoh Finechem Corporation) was dissolved in cyclohexane at a concentration of 20% was put into the nitrogen-purged glass neck flask under a nitrogen stream, followed by cooling to 0° C. 7.4 ml of a toluene solution (6% nickel) of nickel 2-ethylhexanoate (manufactured by Kishida Chemical Co., Ltd.) was added thereto under a nitrogen stream to prepare the homogeneous hydrogenation catalyst.

Comparative Example 5

470 parts by mass of cyclohexane and 30 parts by mass of β-pinene polymer (A3) obtained in Reference Example 3 were put into the nitrogen-purged pressure vessel equipped with a stirrer, and stirred to thoroughly dissolve the β-pinene polymer (A3). The inside of the pressure vessel was sufficiently purged with hydrogen, and while stirring at 1000 rpm under a room temperature, 7 parts by mass of the hydrogenation catalyst prepared in Reference Example 4 was added thereto. Immediately, it was pressurized to 1 MPa with hydrogen and the temperature was elevated to 50° C. Subsequently, 7 parts by mass of hydrogenation catalyst was further added thereto, and the temperature was elevated to 120° C. After the reaction was carried out at 120° C. for 9 hours, it was returned to ambient pressure and room temperature. The aqueous solution in which 8.1 parts by mass of citric acid and 4.8 parts by mass of 30% aqueous solution of hydrogen peroxide were added to 100 parts by mass of distilled water was added to the pressure vessel, and stirred for 30 minutes. The aqueous layer was removed, and the organic layer was washed with distilled water until it was neutralized to remove the catalyst therefrom. The obtained cyclohexane layer was subject to reprecipitation in 6000 parts by mass of a mixed solvent of methanol/acetone (60/40 volume %), and then sufficiently dried to obtain 29 parts by mass of β-pinene-based polymer (B5). The β-pinene-based polymer (B5) thus obtained had 50.0 mole % of residual olefinic double bonds and 0.4 mole % of residual aromatic rings, as measured by $^1$H-NMR. The glass transition temperature was 115° C. Also, the ratio of the proton integral value at 6 to 8 ppm to the total proton integral value in $^1$H-NMR was 9.4×10$^{-4}$, and the ratio of the proton integral value at 4.5 to 6 ppm to the total proton integral value was 2.9×10$^{-2}$. The resulting β-pinene-based polymer (B5) had a weight average molecular weight of 113,000 and a number average molecular weight of 50,800. The evaluation results of the β-pinene-based polymer (B5) are shown in Table 1 below.

Further, for each material obtained in the above processes and the materials prepared from the following processes, the physical properties were measured as follows.

Molding

The obtained β-pinene-based polymers were fabricated into test specimens by press molding or injection molding. The press molding produced a molded article having a size of 50 mm×50 mm×3 mmt at 180° C. The injection molding was performed using a cylinder temperature of 240° C., a mold temperature of 60° C. and a mold of 50 mm×50 mm×3 mmt.

Molecular Weight

The number average molecular weight and the weight average molecular weight were both obtained based on the gel permeation chromatography (GPC) measurement with the reduced polystyrene value. For the GPC apparatus, HLC-8020 (product number) manufactured by Tosoh Corporation was employed, and for the column, one where two TSK gel·GMH-M and one G2000H column manufactured by Tosoh Corporation were connected in series was used.

Residual Double Bond Ratio and Coproduced Aromatic Ring Ratio

The residual double bond ratio and the coproduced aromatic ring ratio were measured at room temperature through 1000 integrations by using a nuclear magnetic resonance apparatus with a 400 MHz magnet, which was manufactured by JEOL. The obtained integral value at 4.5 to 6 ppm in a $^1$H-NMR spectrum (where the protons of tetramethylsilane (TMS) were taken as 0 ppm) was regarded as the β-pinene-derived olefinic double bonds (1H), the integral value at 6 to 8 ppm was regarded as the aromatic rings (4H), and the degree of hydrogenation of the double bonds and the ratio of coproduced aromatic rings were calculated in mole % based on the total number of monomer units. The degree of hydrogenation of the double bonds was calculated in mole % based on the total number of monomer units other than the coproduced aromatic ring units.

Glass Transition Temperature ($T_g$)

The glass transition temperature was measured by differential scanning calorimetry (DSC) using sufficiently dried samples from which solvents were removed. As the measuring apparatus, DSC30 (product number) manufactured by Mettler Toledo Inc. was used.

Total Light Transmittance

The total light transmittance was measured based on JIS-K-7361-1 by using HR-100 (product number) manufactured by Murakami Color Research Laboratory.

Light Resistance Test

The accelerated exposure test was performed based on ASTM-G53 for 100 hours, and the yellowness (Δ YI) before and after the YI (yellow index) test was measured. Here, the ultraviolet exposure tester (ATLAS-UVCON manufactured by Toyo Seiki Seisaku-sho, Ltd.) was used. The YI measurement was performed based on JIS-K-7373. Further, the evaluation was based on the following criteria.

Δ YI=(YI after 100 hour ultraviolet exposure)−(YI before ultraviolet exposure)

○: Δ YI≦0.6 long-term light resistance is very good
X: 0.6<Δ YI long-term light resistance is poor 5% Mass Loss Temperature The thermogravimetric analysis was performed based on JIS-K-7120 in an air atmosphere, and the 5% mass loss temperature was calculated. As the measuring apparatus, TG50 (product number) manufactured by Mettler Toledo Inc. was used.

TABLE 1

|  | EXAMPLE 1 | EXAMPLE 2 | EXAMPLE 3 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 |
|---|---|---|---|---|---|---|---|---|
| POLYMER | H1 | H2 | H3 | B1 | B2 | B3 | B4 | B5 |
| COPRODUCED AROMATIC RING RATIO (MOLE %) | 0.0027 | 0.0015 | 0.0027 | 0.40 | 6.3 | 7.2 | 3.4 | 0.4 |
| INTEGRAL VALUE AT 6 TO 8 PPM/TOTAL INTEGRAL VALUE | $5.9 \times 10^{-6}$ | $4.7 \times 10^6$ | $5.9 \times 10^{-6}$ | $9.1 \times 10^4$ | $1.4 \times 10^{-2}$ | $1.4 \times 10^{-2}$ | $7.7 \times 10^{-3}$ | $9.4 \times 10^{-4}$ |
| P-PHENYLENE GROUP CONTENT (MASS %) | 0.0015 | 0.00083 | 0.0015 | 0.22 | 3.5 | 4.0 | 1.9 | 0.22 |
| HYDROGEN ADDITION RATE OF OLEFINIC DOUBLE BONDS (MOLE %) | 99.977 | 99.974 | 99.977 | 98.3 | 93.5 | 86.3 | 99.5 | 50.0 |
| INTEGRAL VALUE AT 4.5 TO 6 PPM/TOTAL INTEGRAL VALUE | $1.3 \times 10^5$ | $1.0 \times 10^5$ | $1.3 \times 10^5$ | $9.7 \times 10^4$ | $3.7 \times 10^3$ | $7.9 \times 10^3$ | $2.7 \times 10^4$ | $2.9 \times 10^2$ |
| CYCLOHEXENE RING CONTENT (MASS %) | 0.013 | 0.015 | 0.013 | 0.96 | 3.5 | 7.2 | 0.27 | 28 |
| Tg (° C.) | 132 | 95 | 132 | 129 | 124 | 122 | 129 | 115 |
| 5% MASS LOSS TEMPERATURE (° C.) | 410 | 395 | 411 | 360 | 374 | 357 | 364 | 332 |
| TOTAL LIGHT TRANSMITTANCE (%) | 92 | 92 | 92 | 92 | 90 | 89 | 91 | 87 |
| LIGHT RESISTANCE | ○ | ○ | ○ | X | X | X | X | X |

Based on the results of the Examples, since all are β-pinene-based polymers in which the ratio of the proton integral value at 6 to 8 ppm to the total proton integral value in a $^1$H-NMR spectrum is $2.3 \times 10^{-5}$ or less and the ratio of the proton integral value at 4.5 to 6 ppm to the total proton integral value is $2.8 \times 10^{-4}$ or less, the $T_g$ and the 5% mass loss temperature are high, the heat resistance is excellent, the total light transmittance is high, and the light resistance is good.

It can be confirmed from the results of the Examples and the Comparative Examples that when the hydrogenation degree is low, the 5% mass loss temperature is low and the light resistance is poor.

Example 3 and Comparative Example 4 show that even though the cyclohexene ring content is low, many aromatic rings result in low total light transmittance and poor light resistance.

As shown in the Examples and the Comparative Examples, in order to obtain β-pinene-based polymers having a high hydrogenation degree, it is desirable to provide it to the hydrogenation reaction at a hydrogen pressure of 7 MPa or higher in the presence of a supported palladium catalyst.

The invention claimed is:

1. A β-pinene-based polymer comprising 50 mass % or more of β-pinene units, wherein:
   the β-pinene-based polymer is obtained by hydrogenating olefinic double bonds of a first β-pinene-based polymer comprising 50 mass % or more of β-pinene units, in the presence of a catalyst at a hydrogen pressure of 7 MPa or higher;
   a ratio of a proton integral value at 6 to 8 ppm to a total proton integral value in a $^1$H-NMR spectrum is $2.3 \times 10^{-5}$ or less;
   a ratio of a proton integral value at 4.5 to 6 ppm to the total proton integral value is $2.8 \times 10^{-4}$ or less; and
   a number average molecular weight of the polymer is from 30,000 to 200,000 g/mol.

2. The β-pinene-based polymer of claim 1, comprising 80 mass % or more of β-pinene units.

3. The polymer of claim 1, further comprising:
   another monomer unit copolymerizable with β-pinene, wherein the polymer is a random copolymer.

4. The polymer of claim 3, wherein a total content of monomer units copolymerizable with β-pinene is from 0.01 to 20 mole % based on total monomer units of the polymer.

5. The polymer of claim 1, wherein the number average molecular weight of the polymer is from 40,000 to 200,000 g/mol.

6. The polymer of claim 1, wherein a total light transmittance of the polymer is 80% or more.

7. The polymer of claim 1, wherein a 5% mass loss temperature is 300° C. or higher.

8. A molded article comprising the β-pinene-based polymer of claim 1.

9. A method for preparing the β-pinene-based polymer of claim 1, the method comprising:
   hydrogenating the olefinic double bonds of the first β-pinene-based polymer comprising 50 mass % or more of β-pinene units, in the presence of a palladium-supported catalyst at a hydrogen pressure of 7 MPa or higher.

10. The method of claim 9, wherein the catalyst is a palladium-supported carbon catalyst.

11. A β-pinene-based polymer comprising 50 mass % or more of β-pinene units, wherein:
   the β-pinene-based polymer is obtained by hydrogenating olefinic double bonds of a first β-pinene-based polymer comprising 50 mass % or more of β-pinene units, in the presence of a catalyst at a hydrogen pressure of 7 MPa or higher;
   a p-phenylene group content is 0.0055 mass % or less;
   a cyclohexene-1,4-diyl group content is 0.29 mass % or less; and
   a number average molecular weight of the polymer is from 30,000 to 200,000 g/mol.

12. The β-pinene-based polymer of claim 11, comprising 80 mass % or more of β-pinene units.

13. The polymer of claim 11, further comprising:
   another monomer unit copolymerizable with β-pinene, wherein the polymer is a random copolymer.

14. The polymer of claim 13, wherein a total content of monomer units copolymerizable with β-pinene is from 0.01 to 20 mole % based on total monomer units of the polymer.

15. The polymer of claim 11, wherein the number average molecular weight of the polymer is from 40,000 to 200,000 g/mol.

16. The polymer of claim 11, wherein a total light transmittance of the polymer is 80% or more.

17. The polymer of claim 11, wherein a 5% mass loss temperature is 300° C. or higher.

18. A molded article comprising the β-pinene-based polymer of claim 11.

19. A method for preparing the β-pinene-based polymer of claim 11, the method comprising:
   hydrogenating the olefinic double bonds of the first β-pinene-based polymer comprising 50 mass % or more of β-pinene units, in the presence of a palladium-supported catalyst at a hydrogen pressure of 7 MPa or higher.

20. The method of claim 19, wherein the catalyst is a palladium-supported carbon catalyst.

* * * * *